US008296676B2

(12) United States Patent
Millington

(10) Patent No.: US 8,296,676 B2
(45) Date of Patent: Oct. 23, 2012

(54) SYSTEM FOR A TEXT SPELLER

(75) Inventor: Jeffrey A. Millington, Rochester Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 1178 days.

(21) Appl. No.: 12/131,682

(22) Filed: Jun. 2, 2008

(65) Prior Publication Data

US 2009/0097753 A1 Apr. 16, 2009

Related U.S. Application Data

(60) Provisional application No. 60/980,117, filed on Oct. 15, 2007.

(51) Int. Cl.
*G06F 3/048* (2006.01)
(52) U.S. Cl. ........ 715/810; 715/773; 715/816; 715/835; 715/841; 345/168; 345/173
(58) Field of Classification Search .................. 715/773, 715/810, 816, 835, 841; 345/168, 173
See application file for complete search history.

(56) References Cited

U.S. PATENT DOCUMENTS

| 5,543,818 | A | * | 8/1996 | Scott | 345/168 |
| 5,706,450 | A | | 1/1998 | Shaiman et al. | 395/326 |
| 6,016,142 | A | | 1/2000 | Chang et al. | 345/334 |
| 6,031,471 | A | | 2/2000 | Wilson | 341/22 |
| 6,037,942 | A | | 3/2000 | Millington | 345/353 |
| 6,265,554 | B1 | * | 7/2001 | Lehmann et al. | 534/629 |
| 6,271,835 | B1 | * | 8/2001 | Hoeksma | 345/168 |
| 6,377,966 | B1 | | 4/2002 | Cooper et al. | 707/542 |
| 6,639,586 | B2 | | 10/2003 | Gerpheide | 345/173 |
| 6,765,554 | B2 | * | 7/2004 | Millington | 345/156 |
| 6,857,105 | B1 | * | 2/2005 | Fox et al. | 715/825 |
| 7,136,047 | B2 | | 11/2006 | Shimada et al. | 345/168 |
| 2009/0249203 | A1 | * | 10/2009 | Tsuruta et al. | 715/702 |

OTHER PUBLICATIONS

Garmin Zūmo Owner's Manual, dated Mar. 2007, http://www8.garmin.com, Garmin.
GPS Magazine Review of Magellan Maestro, dated Apr. 2007, http://www.gpsmagazine.com, GPS.
Image of Dashboard of Cadillac CTS, taken prior to Oct. 15, 2007.

(Continued)

*Primary Examiner* — Mark Rinehart
*Assistant Examiner* — Sajeda Muhebbullah
(74) *Attorney, Agent, or Firm* — Brinks Hofer Gilson & Lione

(57) ABSTRACT

An apparatus may generate a text entry with a user interface. The apparatus may include a display, a user input device, a memory and a processor. The apparatus may display single character user input controls and multi-character user input controls on the display. Each of the single character user input controls and the multi-character user input controls may be buttons selectable with the user input device. A single character user input control may correspond to a single character and a multi-character user input control may correspond to a group of characters. The apparatus may display one of the multi-character user input controls in a display region and other user input controls outside of the display region. If the multi-character user input control is selected, the apparatus may replace the multi-character user input control with a second set of single character user input controls in an expanded display region.

18 Claims, 13 Drawing Sheets

OTHER PUBLICATIONS

Image of Dashboard of Cadillac SRS, taken prior to Oct. 15, 2007.
Image of Dashboard of Dodge Nitro, taken prior to Oct. 15, 2007.
Image of Dashboard of Infinity G35, taken prior to Oct. 15, 2007.
Image of Dashboard of Nissan Altima, taken prior to Oct. 15, 2007.
Magellan Maestro User Manual, dated 2007, http://magellangps.com, Magellan.
Tom Tom Owner's Manual, dated 2007 and at least a portion is prior to Oct. 15, 2007, http://tomtom.com, Tom Tom.

* cited by examiner

SYSTEM FOR A TEXT SPELLER

PRIORITY CLAIM

This application claims the benefit of priority from U.S. Provisional Application No. 60/980,117, filed Oct. 15, 2007, which is incorporated by reference.

BACKGROUND OF THE INVENTION

1. Technical Field

This invention relates generally to user interfaces and, more particularly, to a text speller in a user interface such as in a vehicle navigation system.

2. Related Art

Most electronic systems and devices include a user interface to not only provide information to users of these systems, but also to receive user commands and other inputs to such systems. Such user interfaces can include a display screen in combination with one or more user input devices, such as buttons, knobs, or joysticks. User input devices may also include touch screen display capability, cursor control devices such as a mouse, microphones and voice responsiveness capability, and other mechanisms and systems that provide a communication path to exchange data between users and such systems. Examples of such electronic devices and systems include stationary devices such as automated teller bank machines and airline flight check in kiosks, and mobile devices such as PDAs (personal digital assistants), mobile phones, and vehicle passenger entertainment systems. Vehicle entertainment systems can include audio systems, mobile communication systems and vehicle navigation systems, for example.

SUMMARY

An apparatus may generate a text entry with a user interface. The apparatus may include a display, a user input device, a memory and a processor. The apparatus may display user input controls on the display. The user input controls may include single character user input controls and multi-character user input controls. The single character user input controls and the multi-character user input controls may be buttons selectable with the user input device. A single character user input control may correspond to a single character and a multi-character user input control may correspond to a group of characters. The apparatus may display one of the multi-character user input controls in a display region and other user input controls in other display regions. If the multi-character user input control is selected, the apparatus may replace the multi-character user input control with a set of single character user input controls in an expanded display region. The expanded display region may include the display region. If a single character user input control is selected, a character corresponding to the selected single character user input control is added to a text entry.

An interesting feature of one example of the apparatus simplifies entering of information by tracking recent entries based on a speller type. The speller type may be an indication of the type of information that the apparatus is to obtain from a user. Examples of speller types may include a city type, a state type, a street address type, and a person's name type. The apparatus may progressively narrow the list of recent entries of that speller type as the user enters new characters with the apparatus.

A method of displaying user input controls may operate by displaying at least one of the user input controls in separate display regions. Each of the display regions may correspond to a character group formed from selectable characters. The user input controls may include a multi-character user input control, which is displayed in one of the display regions. If a user selects the multi-character user input control, the operation may continue by displaying single character user input controls in the display region instead of the multi-character user input control. Displaying the single character user input controls may include resizing the display region and shifting the position of at least one of the other display regions in order to accommodate the resized display region.

If the user selects one of the single character user input controls, the operation continues by adding a character that corresponds to the selected single character user input control to a text entry. The operation may include displaying a visual indication on the multi-character input control that indicates what characters are included in a group of characters corresponding to the multi-character user input control.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
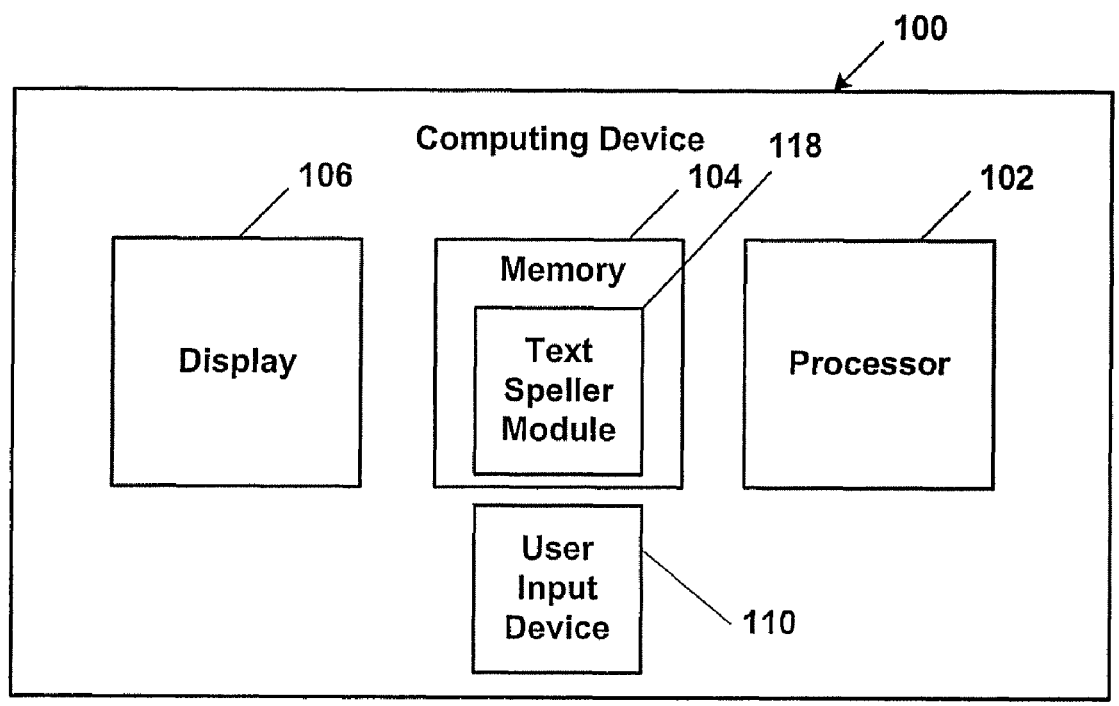
FIG. 1 illustrates an example of an apparatus that includes a text speller module.

FIG. 1 illustrates an example of an apparatus that is computing device 100 (CD) that includes a text speller module. The CD 100 may be a personal computer (PC), a portable global positioning system, a cell phone, a personal digital assistant, an MPEG player or any other device or system capable of executing instructions, software code, or otherwise performing logic. The CD 100 may also use the text speller module 118 to obtain a text entry from a user for any purpose, such as entering a contact name, a song name, a destination street name, or any other desired entry.

The CD 100 includes at least a display 106, a processor 102, and memory 104. The processor 102 may be any form of microprocessor, analog or digital, capable of executing instructions or code. The memory 104 may be any form of data storage mechanism accessible by the processor 102 or any combination of such forms, such as, a magnetic media, an optical disk, a random access memory (RAM), a flash memory, or an electrically erasable programmable read-only memory (EEPROM). The display 106 should be broadly construed to include any device operable to convert electrical signals into information presented to the user in some visually perceivable form, such as a liquid crystal display ("LCD"), a cathode-ray tube ("CRT") display, an electroluminescent display ("ELD"), a heads-up display ("HUD"), a plasma display panel ("PDP"), or a vacuum fluorescent display ("VFD"). The display 106 is coupled to the processor 102. A device may be coupled to another device if electrical signals may be transmitted between the two devices using one or more electrical connections, optical connections, or any other type of connections now known or later discovered that are capable of transmitting a signal. A device in communication with another device may be coupled to each other.

The memory 104 may include computer code. The processor 102 is operable to execute the computer code stored in the memory 104. The computer code may include the text speller module 118.

The CD 100 may also include a user input device 110 that is coupled to the processor 102. The input device may be a wheel button, a joystick, a keypad, a touch-screen configuration or any other device or mechanism capable of receiving an input from a user and providing such an input as an input signal. Code stored in the memory 104 may receive such an input signal from the user input device. In one example, the display 106 may be configured as a touch-screen display that provides user input by converting contact with the surface of the display 106 into electrical signals readable or receivable by the processor 102. In another example, the text speller module 118 may display a cursor on the display 106. The cursor may be directed by the user with a joystick, or some other device or mechanism. When the user directs the cursor to move over a button drawn on the display 106 and selects the button, such as by clicking a joystick button, the text speller module 118 may be provided a signal indicative of the selection, and behave as it would if the user contacted the screen of display 106 proximate to the button drawn on a display, where the display is a touch-screen display.

Figure 2:
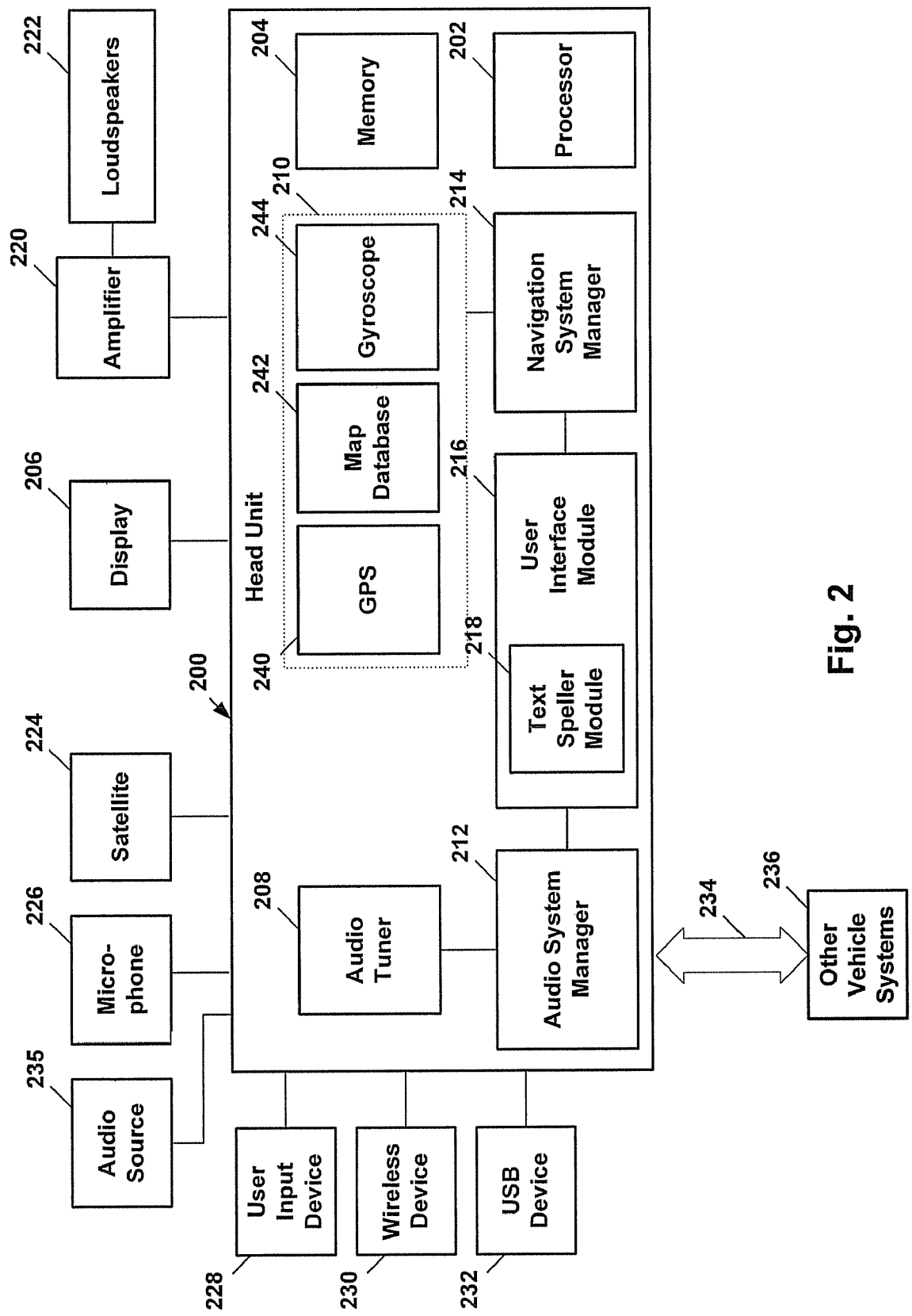
FIG. 2 illustrates an example of an audio system, such as an audio system in a vehicle that includes the text speller module.

FIG. 2 illustrates an example of an apparatus that is an audio system, such as an audio system in a vehicle that includes a text speller module 218. In other examples, the text speller module 218 may be included in any other form of computing device or system and that use of the text speller module 218 in an audio system, or an audio system for a vehicle should not be construed as limiting the scope of application of the text speller module 218 to only certain systems, devices, or applications. To the contrary, the text speller module 218 may be used in any system, device, or application where user input of any form of characters is desired.

The example audio system may include a head unit 200, a display 206, an amplifier 220, loudspeakers 222, a microphone 226, a user input device 228, a wireless device 230, a USB device 232, a bus 234, an audio source 235, and other vehicle systems 236. In other examples, the audio system may include fewer or greater amounts of functionality and/or features, devices, and systems that provide or support provision of audio and/or visual inputs and/or outputs to a user. The head unit 200 may be coupled to the display 206 and the amplifier 220. The amplifier 220 may be coupled to the loudspeakers 222. The head unit 200 may communicate through the bus 234 to the other vehicle systems 236. The other vehicle systems 236 of this example may include vehicle speed, number of passengers, or any other operational related vehicle parameters available from various systems included in the vehicle that are capable of communication on the bus 234. The display 206 may be, for example, a touch-screen display that provides user input by converting contact with the surface of the display into electrical signals. In other examples, the display 206 may be any other form of display. The display 206 should be broadly construed to include a device operable to convert electrical signals into information presented to the user in some form, such as CRTs, LCDs, and LEDs.

The head unit 200 may include an audio tuner 208 and a navigation system unit 210. In other examples, the head unit 200 may include additional or fewer operational functionalities. The audio tuner 208 and/or the navigation system unit 210 may be external to the head unit 200 or internal to the head unit 200. The head unit 200 may further include a processor 202 and a memory 204. The processor 202 can be any form of processor, analog or digital, such as one or more microprocessors and/or digital signal processors (DSP). The memory 204 may be any form of data storage mechanism accessible by the processor 202, such as, a magnetic media, an optical disk, a random access memory (RAM), flash memory, or electrically erasable programmable read-only memory (EEPROM). The example navigation system unit 210 may include a geographic positioning system (GPS) 240, a map database 242, and a gyroscope 244. In other examples, the navigation system 210 may include any other location related functionality or information. The GPS 240 may determine the physical location of the head unit 200 using information wirelessly transmitted from a satellite 224 and received via antenna. Positioning information may also be available from cellular towers, or other positioning constellations GLONASS or Galileo. The map database 242 may be stored in the memory 204, and/or may be stored external to the head unit 200. For example, the map database 242 may be stored external to the vehicle, and may be accessible wirelessly. In another example, the map database 242 may be stored internal to the vehicle or stored in two or more databases that are internal and external to the vehicle.

The head unit 200 may interact with a user through external devices in communication with the head unit 200 such as the display 206, microphone 226, user input device 228, wireless device 230, USB device 232, other vehicle systems 236, and/or the combination of the amplifier 220 and the loudspeakers 222. The user input device 228 may be any electro-mechanical device, electro-optical device, or any other type of device, now known or later discovered, that is configured to convert user inputs into electrical signals such as a mouse, joystick, trackball, camera, keyboard, keypad, wireless device, or touch-screen display.

In one example, the processor 202 may be operable to execute computer instructions embodied in code stored in the memory 204. In other examples, the code may be stored external to the head unit 200, or external to the vehicle and be accessible to the processor 202 via a wired communication link, a wireless communication link, or some combination of wireless and wired communication links. In still other examples, portions of the code may be stored in the memory 204 and other portions of the code may be stored external to the memory 204. The code stored in the memory 204 may include the text speller module 218. The code may also include a user interface module 216, an audio system manager 212 and a navigation system manager 214. In other examples, additional or fewer modules may be included in the code. In addition, the number and description of specific modules included in memory 204 are examples used to describe the functionality and should not be construed as limiting the configuration or functionality of the head unit 200. The audio system manager 212 may control the audio tuner 208. The navigation system manager 214 may control the navigation system unit 210.

During operation, the user interface module 216 may obtain user input from any input device, such as the display 206, the microphone 226, and/or the user input device 228. The user interface module 216 may display information on the display 206. The text speller module 218 may be a stand-alone separate module, part of the user interface module 216, or included in one or more other modules of the head unit 200. Code included in the head unit 200, may use the text speller module 212 to obtain an input from a user. The text speller module 218 may communicate with the user interface module 216 to obtain a user input and to display information on the display 206.

Figure 3:
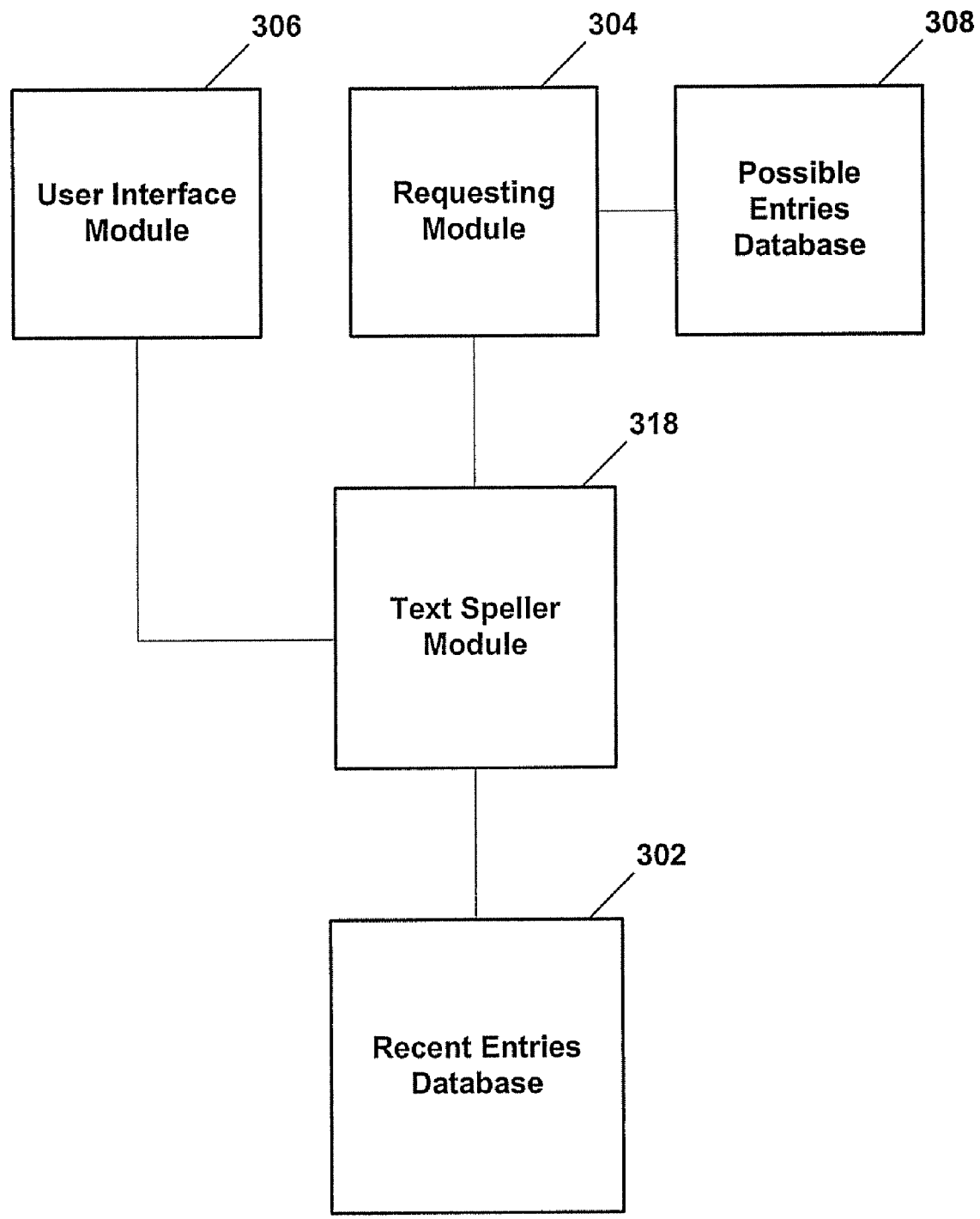
FIG. 3 illustrates an example of the text speller module in interaction with other code modules in a system.

FIG. 3 illustrates an example of a text speller module 318 in interaction with other code modules in a system. In this example, the other modules include a requesting module 304 and a user interface module 306. In other examples, depending on the particular application in which the text speller module 318 is deployed, any number of modules describing the functionality of the system in which the text speller module 318 is operational may be included. The code modules may also include a possible entries database 308 and a recent entries database 302. The requesting module 304 may be any code that receives an entry of data by a user from the text speller module 318, such as a contact management module and/or a navigation module. Any system may include multiple requesting modules 304. The text speller module 318 may display information and obtain information from a user via the user interface module 306.

The possible entries database 308 may be any kind of database. A database may be any electronic collection of information that is organized so that it can be accessed, managed, and updated, such as a Relational Database Management System (RDBMS), an object-oriented database, an extensible markup language database (XML), a file system, or a logical structure stored in memory. The recent entries database 302 may also be any kind of database. The recent entries database 302 and the possible entries database 308 may be the same database or different databases.

During the operation of one example system, the requesting module 304, prior to invoking the text speller module 318, may obtain a list of possible entries from the possible entries database 308. When the requesting module 304 invokes the text speller module 318 to obtain a text entry, the requesting module 304 may pass the list of possible entries as an argument to a subroutine of the text speller module 318. The text speller module 318 may subsequently use the list of possible entries, in conjunction with a partial entry manually entered by a user, in an effort to predict what the user would eventually manually enter. The text speller module 318 may permit the user to select a complete entry from the list of possible entries in lieu of manually completing the partial entry.

In another example system, the text speller module 318 may obtain a list of possible entries from the possible entries database 308 after being invoked by the requesting module 304. In one example, the requesting module 304 may pass a reference to a callback subroutine as an argument when invoking the text speller module 318. The text speller module 318 may invoke the callback subroutine to obtain a list of possible entries. In a different example, text speller module 318 may pass information manually entered by a user as an argument to the callback subroutine to restrict the list of possible entries returned by the callback subroutine based on the information manually entered by the user. These examples are merely illustrative examples and should not be construed as limiting how the text speller module 318 obtains the list of possible entries from the possible entries database 308.

The text speller module 318 may also obtain a list of recent entries from the recent entries database 302. For example, the requesting module 304 may pass a speller type as an argument to a subroutine of the text speller module 318. A speller type is defined as an indication of the type of data that the text speller module 318 is to obtain from the user. The text speller module 318 may search the recent entries database 302 for a list of recent complete entries made by the text speller module 318 corresponding to the speller type. The text speller module 318 may combine the list of recent entries, together with a partial entry manually entered by a user, in an effort to predict what the user will eventually manually enter. The text speller module 318 may permit the user to select a complete entry from a list of recent entries in lieu of manually completing the partial entry. This example is merely an illustrative example and should not be construed to limit how the text speller module 318 obtains the list of recent entries from the recent entries database 302.

The list of recent entries may be restricted using other information in addition to or instead of speller type. As a first example, the list of recent entries may be restricted based on an active database configuration of a navigation system unit. An active database configuration may be a database containing data specific to a geographic region such as a country. In one example system, if a navigation system unit is currently physically located in Canada, an active database configuration may be set to Canada. The list of recent entries may be limited to entries that apply only to Canada, excluding entries that apply to other geographic regions. The text speller module 318, the requesting module 304, code managing the recent entry database 302, or any other code may perform this restriction.

As a second example, the list of recent entries may also be restricted based on the user's context. For example, if a user is to enter a destination address, the user may first enter a state name, then a city name, and finally a street name. If the user is entering the city name, the list of recent entries may be restricted to only those items having cities located in the state the user entered with the text speller module. If the user is entering the street name, the list of recent entries may be restricted to only those items having streets located in the city and state the user just entered. In other examples, if the user is entering the city name, the list of recent entries may be restricted to only those items having cities located in the state the user is currently physically located in. Restricting the list of entries based on context may apply to any user context, such as: restricting a list of recent entries to songs performed by an artist whose name was just entered by the user or restricting a list of recent entries to points of interest located in a city just entered by the user. The text speller module 318, the requesting module 304, code managing the recent entry database 302, or any other code may perform this restriction.

As a third example, the list of recent entries may also be restricted based on the current user. An example system may have multiple users and be able to determine the current user. In such a system, the list of recent entries may be restricted to only those recent entries made by the current user.

After obtaining a complete entry of data from the user, the text speller module 318 may store the complete entry, a text entry, in the recent entries database 302 before returning the text entry to the requesting module 304. In other examples, the requesting module 304 may access the recent entries database 302 instead of the text speller module 318: the requesting module 304 may pass any list of recent entries to the text speller module 318, and the requesting module 304 may store the text entry in the recent entries database 302. In still other examples, any other module may access the recent entries database 302.

A speller type may be defined as the type of data that the text speller module 318 is to obtain from the user for a particular requesting module 304. For example, a system might have a contact address speller type and a destination address speller type, where a contact manager module uses the contact address speller type, and a navigation system manager module uses the destination address speller type. A system may use more or less speller types depending on how narrowly or broadly recent entries made by a user may apply.

The speller type may be determined using any method. For example, the text speller module 318 may accept the speller type as an argument to a subroutine of the text speller module 318. In a different example, the text speller module 318 may determine the speller type. In some systems, a particular module may invoke a system-level module to determine what subroutine included in what module invoked that particular module. In such systems, the text speller module 318 may invoke the system-level module to determine what subroutine and module invoked the text speller module 318. The text speller module 318 may then set the speller type to, for example, a concatenation of the subroutine name and the name of the requesting module 304.

Both the recent entries database 302 and the possible entries database 308 may be used together during user entry to most accurately predict what a user is entering. In still other examples, the recent entries database 302 and the possible entries database 308 may be used sequentially. In other examples, the sequential order of use of the recent entries database 302 and the possible entries database 308 may be a user preference setting that is pre-stored, or is selected during manual entry by the user. In yet other examples, the possible entries database 308 may be the superset to the recent entries database 302.

The number of items stored in the recent entries database 302 may be limited to a predetermined amount. For example, the predetermined amount may be hard coded, obtained from a user preference setting, and/or determined dynamically based on available storage space. The predetermined amount may alternatively, or in addition, depend on the speller type.

One example of a requesting module 304 is the navigation system manager 214 described with reference to FIG. 2. In this example, the navigation system manager 214 may anticipate a user entering information from a predetermined category of information, such as a destination state name. For example, the navigation system manager 214 may obtain a list of possible entries, which includes a list of state names, from a map database 242 described with reference to FIG. 2. The speller type in that example might be a destination state name.

Figure 4:
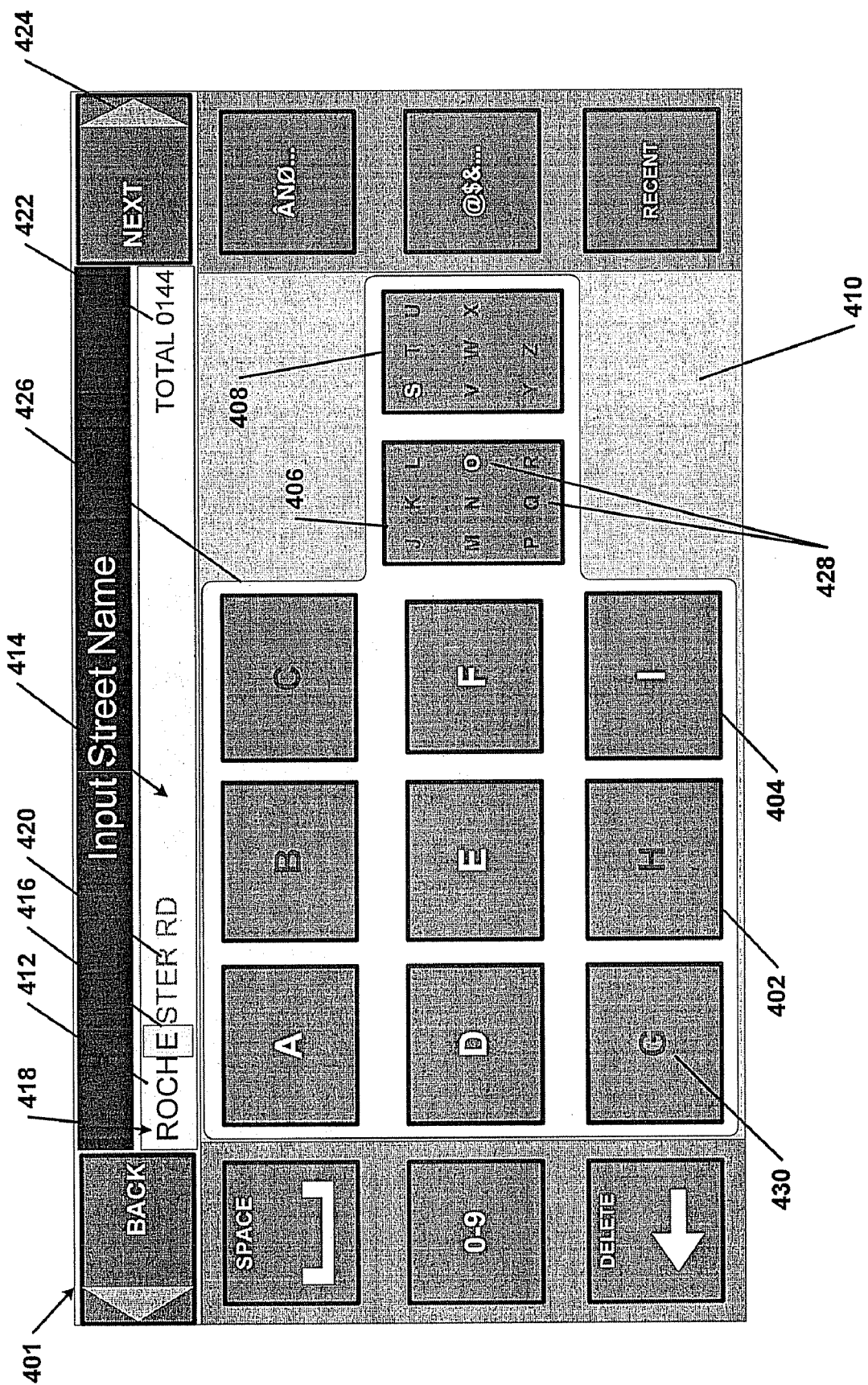
FIG. 4 illustrates an example display screen of an example first user interface generated with the text speller module of FIGS. 1-3.

FIG. 4 illustrates an example display screen 401 of an example first user interface generated with the text speller modules of FIGS. 1-3. In some examples, the text speller module 318 (118 or 218) may display user input controls corresponding to characters. The user input controls may be any user input controls operable to receive a selection signal by a user, such as <HREF> elements in HTML, buttons, and tabs. As used herein, the term "character" or "characters" includes letters, numbers, symbols, icons, logos, or any other visual representation that has meaning to a user and/or a system in which the text speller module is deployed. The user input controls may be single character user input controls such as an "H" single character user input control 402 or an "I" single character user input control 404. The user input controls may also be multi-character user input controls, such as multi-character user input controls 406 and 408. A single character user input control, 402 and 404, corresponds to a single character. A multi-character user input control, 406 and 408, corresponds to a group of characters. As used herein, the term "selectable character" or "selectable characters" refers to any character corresponding to any of the user input controls.

In some examples, the user interface may include a character button pane 410 on which the text speller module 318 displays the user input controls corresponding to the characters. The single character user input controls, 402 and 404, may be displayed as a collection of user input controls.

The text speller module 318 may also display a partial entry 412 in an entry field 414. The partial entry 412 includes characters manually entered by a user during operation (or one or more characters auto-filled by name completion). The entry field 414 is any user interface control operable to display text. In other examples, the text speller module 318 may display a partial entry 412 without the entry field 414. In still other examples, the text speller module 318 may not display the partial entry 412.

During operation, if a user selects a single character user input control, 402 or 404, a character corresponding to the single character user input control, 402 or 404, selected by the user may be concatenated to an end of the partial entry 412. The text speller module may display a position cursor 416 to indicate the end of the partial entry 412. The partial entry 412 may include a beginning character 418 if the user has made any manual entry. As the user sequentially selects the single character user input controls, 402 and 404, the corresponding characters may be sequentially added to the end of the partial entry 412 in order to spell out a text entry that is being manually entered into the entry field 414 by the user. The user may select a single character user input control, 402 and 404, or a multi-character user input control, 406 and 408, using any selection method now known or later discovered, such as by contacting a touch-screen display, speaking a command, or moving a cursor over the user input control with a mouse, joystick or other maneuvering apparatus and pressing a button on a user input device 110 (FIG. 1), such as a mouse button. In some examples, the user may use a different selection method for the single character user input control, 402 or 404, than the multi-character user input control, 406 or 408.

Also during operation, the text speller module 318 may display information received from an entries database. Depending on the example, the entries database may be a possible entries database 308 or a recent entries database 302, or both (FIG. 3). For example, the text speller module 318 may display a first entry 420 of a list of possible entries received from the possible entries database 308. In another example, the text speller module 318 may display a last entry 420 of the list of entries received from the possible entries database 308. In yet another example, the list of entries may be all entries stored in the possible entries database 308 beginning with the partial entry 412. The first entry 420 may be displayed in the entry field 414, where the characters not yet manually entered by the user are displayed differently than the partial entry 412. A different text style may be used, such as bold vs. plain face or italics vs. non italics. The text speller module 318 may display a numerical count 422 of the entries in the list of entries. Thus, as the user manually enters more characters that are concatenated to the end of the partial entry 412, the numerical count 422 may decrease and the first entry 420 may change as the list of entries changes.

The text speller module 318 may also display a next user input control 424. Selection of the next user input control 424 navigates to a new screen from which the user may select an entry from the list of the possible entries, where the text entry is set to the selected entry. In some examples, if the numerical count 422 is one, then selection of the next user input control 424 operates to set the text entry to the first entry 420.

Similarly, a first item 420 from a list of recent entries, received from the recent entries database 302 described in FIG. 3, that begins with the partial entry 412 may be displayed. The characters of the first item 420 not yet entered by the user are displayed differently than the characters of the partial entry 412. A different text style may be used such as bold vs. plain face or italics vs. non italics. A total number of items 422 in the list of recent entries that match the partial entry 412 may be displayed. Selection of the next user input control 424 navigates to a new screen from which the user may select an entry from the list of the recent entries, where the text entry is set to the selected entry. In some examples, if the numerical count 422 is one, then selection of the next user input control 424 operates to set the text entry to the first entry 420.

As discussed above, a single character user input control, 402 and 404, may correspond to a single character and a multi-character user input control, 406 and 408, may correspond to a group of characters. In FIG. 4, the selectable characters include the letters of the English alphabet: "a", "b", "c", "d", "e", "f", "g", "h", "i", "j", "k", "l", "m", "n", "o", "p", "q", "r", "s", "t", "u", "v", "w", "x", "y", and "z". In this example, the groups of characters may include a first group of letters "a" through "i", a second group of letters "j" through "r", and a third group of letters "s" through "z". Dividing the characters in such a manner forms two groups of nine and one group of eight. In other examples, the groups may be differently sized and there may be more or less groups. In still other examples, a collection of numbers, characters, words, or any other collection of characters may be divided into groups.

A first group of characters 426 may be displayed on corresponding single character user input controls, such as 402 and 404. The first group of characters 426 may be referred to as a maximized group. The remaining groups may be displayed using multi-character user input controls, such as 406 and 408. The remaining groups may be referred to as minimized groups. The characters included in the maximized group may be referred to as maximized characters 430 and the characters included in the minimized group may be identified as minimized characters 428. Any algorithm may be used to determine which group of characters is initially the maximized group. Alternatively, the group that is initially the maximized group may be predetermined by user preference or be hard coded. In still other examples, no group may be initially maximized.

In one example, the characters 428 corresponding to the multi-character user input control 406 may be displayed on the multi-character user input control 406 using a smaller font size than is used to display a character 430 on a single character user input control 404. For example, in the example display screen 401, the characters "J" through "R" in the English alphabet are displayed on a first multi-character user input control 406 in a font size smaller than the character "H," which corresponds to one of the single character user input controls 402.

In other examples, any visual indication may be displayed on each of the multi-character user input controls, 406 and 408, that indicates what characters are included in a group corresponding to each of the multi-character user input controls, 406 and 408. For example, visual indication of the characters in the group corresponding to the multi-character user input control 406 may be displayed as a range of characters, such as "J-R."

The placement of the multi-character user input controls, 406 and 408, in relation to the single character user input controls, 402 and 404, may suggest what characters correspond to the multi-character user input controls, 406 and 408. For example, placement may suggest the corresponding characters when the characters that are divided into the groups have an order in a predefined sequence. For example, the characters may have an order in a predefined sequence where the characters from all of the groups together form an alphabet and the alphabet has an alphabetic order. In another example, the characters may have an order in a predefined sequence where the characters are integers in ascending or descending order. In yet another example, the characters may have an order in a predefined sequence defined by a character set encoding table, such as a code page.

Selectable characters may be sequentially consecutive characters in the predefined sequence. Sequentially consecutive characters are characters that follow each other in the predefined sequence without skipping any characters. Alternatively, the selectable characters may not be sequentially consecutive characters in the predefined sequence.

Where the characters have an order in a predefined sequence, the groups may have an order determined by the predetermined sequence. For example, if each of the groups of characters includes only sequentially consecutive characters in the predefined sequence and no two groups have any characters in common, then each of the groups may be ordered based on a relative position in the predefined sequence of one of the characters of each of the groups. In another example, the groups may be ordered based on the predefined sequence where no two groups have any character in common, each group has a lowest and highest character in the predefined sequence, and no characters from the other groups fall between the lowest and highest character of each group.

As an example of placement suggesting what characters correspond to each of the multi-character user input controls, 406 and 408, consider FIG. 4. In FIG. 4, a first multi-character user input control 406 is positioned immediately to the right of the first group of characters 426 displayed on single character user input controls, 402 and 404. Such a placement may suggest to the user that the characters corresponding to the first multi-character user input control 406 are the characters that sequentially follow a character of the first group of characters 426 having the highest order in the predefined sequence of the first group of characters 426. Placing a second multi-character user input control 408 to the right of the first multi-character user input control 406 may further suggest that the characters corresponding to the second multi-character user input control 408 sequentially follow one or more of the characters corresponding to the first multi-character user input control 406.

During operation with respect to the display screen 401 shown in FIG. 4, a user may indicate a selection of a character that belongs to a minimized group of characters corresponding to a multi-character user input control 408 by selecting the multi-character user input control 408. When a user selects one of the multi-character user input controls, 406 or 408, the text speller module 318 may internally identify the currently maximized group as one of the minimized groups, and internally identify the group of characters corresponding to the multi-character user input control, 406 or 408, selected by the user as a new maximized group of characters. The text speller module 318 may internally identify a group in any manner that computer code may identify a data structure, such as storing a reference to the data structure in a programming variable or setting an attribute of the data structure to a determined value.

Figure 5:
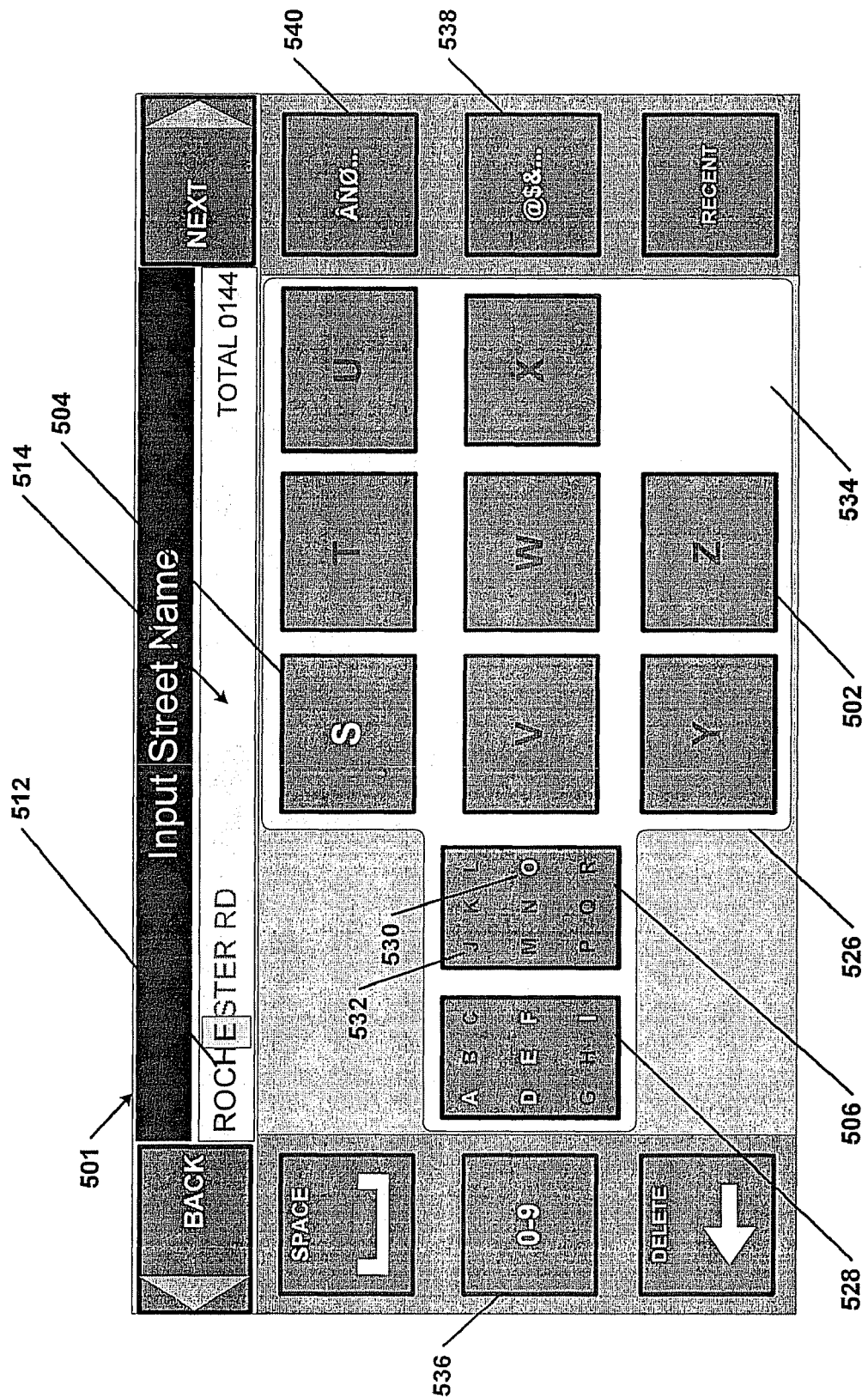
FIG. 5 illustrates an example display screen of an example second user interface generated with the text speller module of FIGS. 1-3.

FIG. 5 illustrates an example display screen 501 of an example second user interface generated with the text speller modules of FIGS. 1-3. In one example, the text speller module 318 may display the display screen 501 after a user selects one of the multi-character user input controls 406 or 408 shown in FIG. 4. In response to this selection, the text speller module 318 may display the originally minimized group (i.e., the group of characters corresponding to the selected multi-character character user input control 406 or 408) as a second group of characters 526 corresponding to single character user input controls 502. The text speller module 318 may display a single multi-character user input control 528 corresponding to the originally maximized group of characters 426. The text speller module 318 may display any of the multi-character user input controls 406 that were not selected by the user the same as before, such the multi-character user input control 406 shown in FIG. 4 and the multi-character user input control 506 shown in FIG. 5.

In another example, a user may be permitted by the text speller module 318 to enter only those entries that belong to a list of entries obtained from an entries database, such as a possible entries database 308 or a recent entries database 302 (FIG. 3). In such an example, as the user selects characters by selecting single character user input controls 502, the partial entry 512 should match, at least partially, the entries in the list of entries. Otherwise, at least in the case of a possible entries database 308, the text speller module 318 would be permitting the user to make entries that were not possible entries. Either an entry may match the partial entry 512 exactly, or the entry may have a next character that follows the last character of the partial entry 512. A set of characters including the next character of each of the entries may be a certain subset of the characters corresponding to user input controls. Therefore, the text speller module 318 may enable only single character user input controls 504 that belong to this certain subset of characters. For example, in display screen 501, the "S" single character user input control 504 is enabled and the "Z" single character user input control 502 is disabled, because the letter "S" matches at least one possible entry.

In some examples, the text speller module 318 may disable a multi-character user input control, 506 or 528, where no characters of a group of characters corresponding to the multi-character user input control belong to this certain subset of characters. As discussed above, a user may indicate that he or she wants to enter a character corresponding to a multi-character user input control 506 by selecting the multi-character user input control 506. If that character is the only character corresponding to the multi-character user input control 506 that belongs to this certain subset of characters, the text speller module 318 may simply concatenate that character to the partial entry 512, instead of maximizing the group and displaying the corresponding single character user input controls 502. Such behavior may be optional as determined by a user preference, such as a pre-stored user preference.

In another example, the behavior described for a list of possible entries, may be implemented for a list of recent entries. The behavior for a list of recent entries may be optional based on a user preference, be implemented in lieu of the behavior for a list of possible entries, or be operable in combination with the behavior for a list of possible entries.

In another example, when a multi-character user input control, 506 or 528, displays multiple characters thereon, the characters corresponding to the multi-character user input control 506 or 528 that belong to this certain subset of characters may be displayed differently than other characters on the same multi-character user input control 506 and 528. For example in display screen 501, an "O" character 530 on the multi-character user input control 506 is displayed differently than the "J" character 532. In other examples, if a user is permitted to enter any character regardless of any list of possible entries or of recent entries, the text speller module 318 may enable all of the single character user input controls, 502 and 504, and multi-character user input controls, 506 and 528, and simply display this certain subset of characters differently than others characters corresponding to the user input controls.

As illustrated in FIG. 5, a group of characters 526 may be displayed on a grid of single character user input controls, 502 and 504. The grid may have three rows and three columns, or any other number of rows and columns. In some examples, the same size grid may be used to display any maximized group, regardless of the number of characters in the group. In such examples, if the number of characters in a particular group of characters is less than the number of cells in the grid, a blank space may be displayed in, for example, the lower-right corner of the grid. However, any other arrangement of characters within the grid may be used. In other examples, an arrangement other than a grid may be used to position the single character user input controls, 502 and 504.

Figure 6:
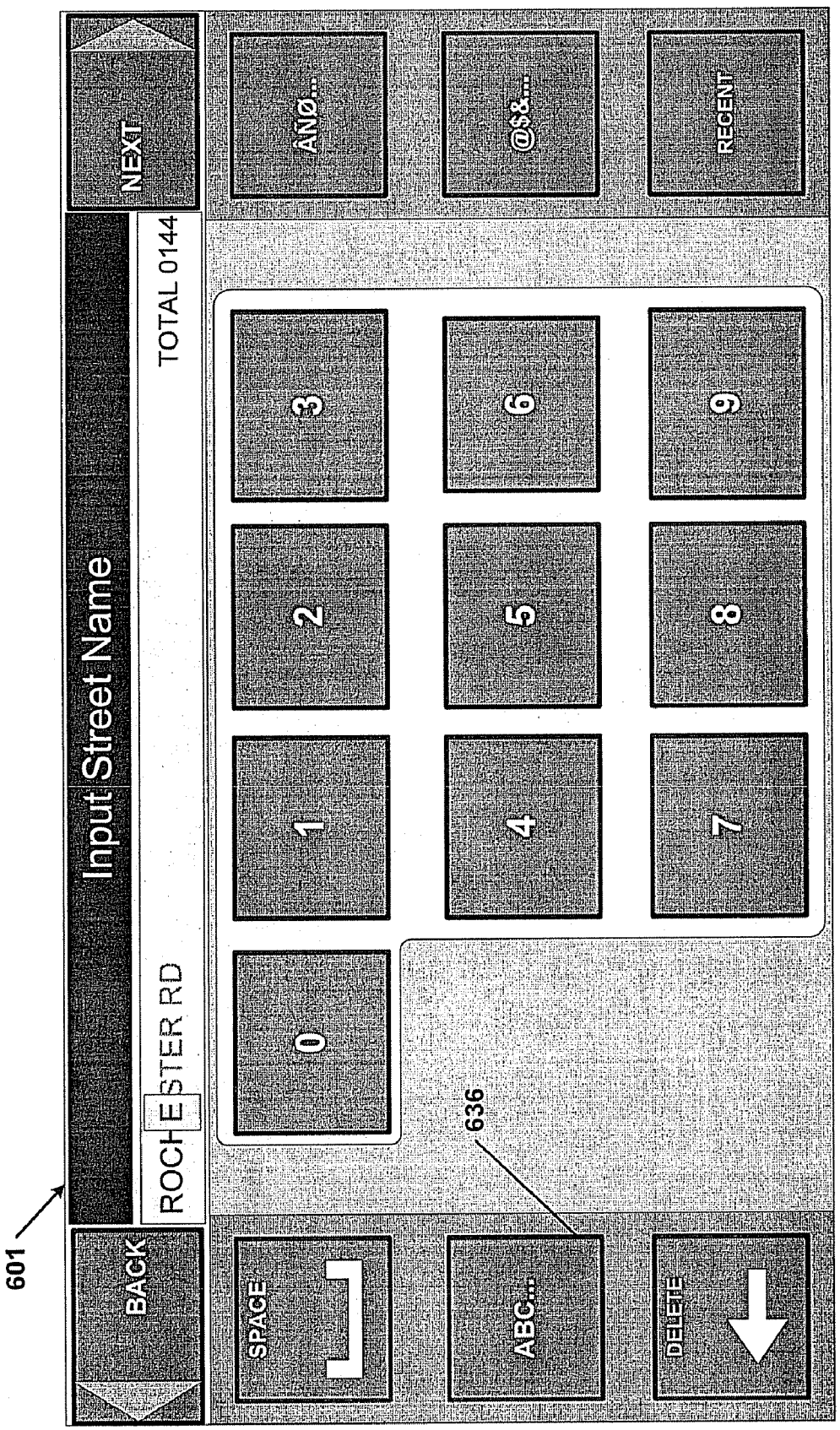
FIG. 6 illustrates an example display screen of an example user interface that permits entry of numbers.
Figure 10:
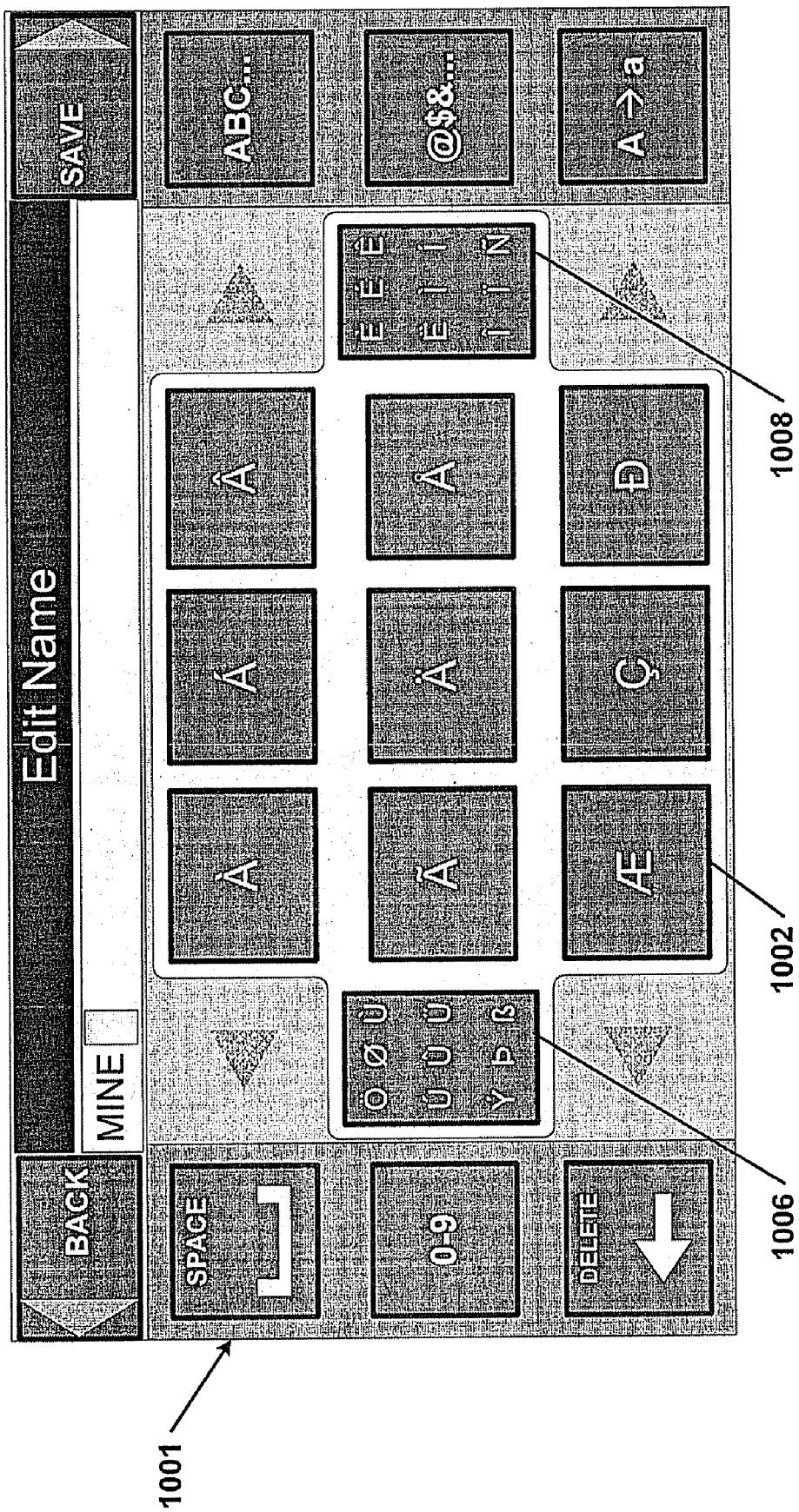
FIG. 10 illustrates an example display screen of an example fifth user interface generated with the text speller module of FIGS. 1-3.
Figure 11:
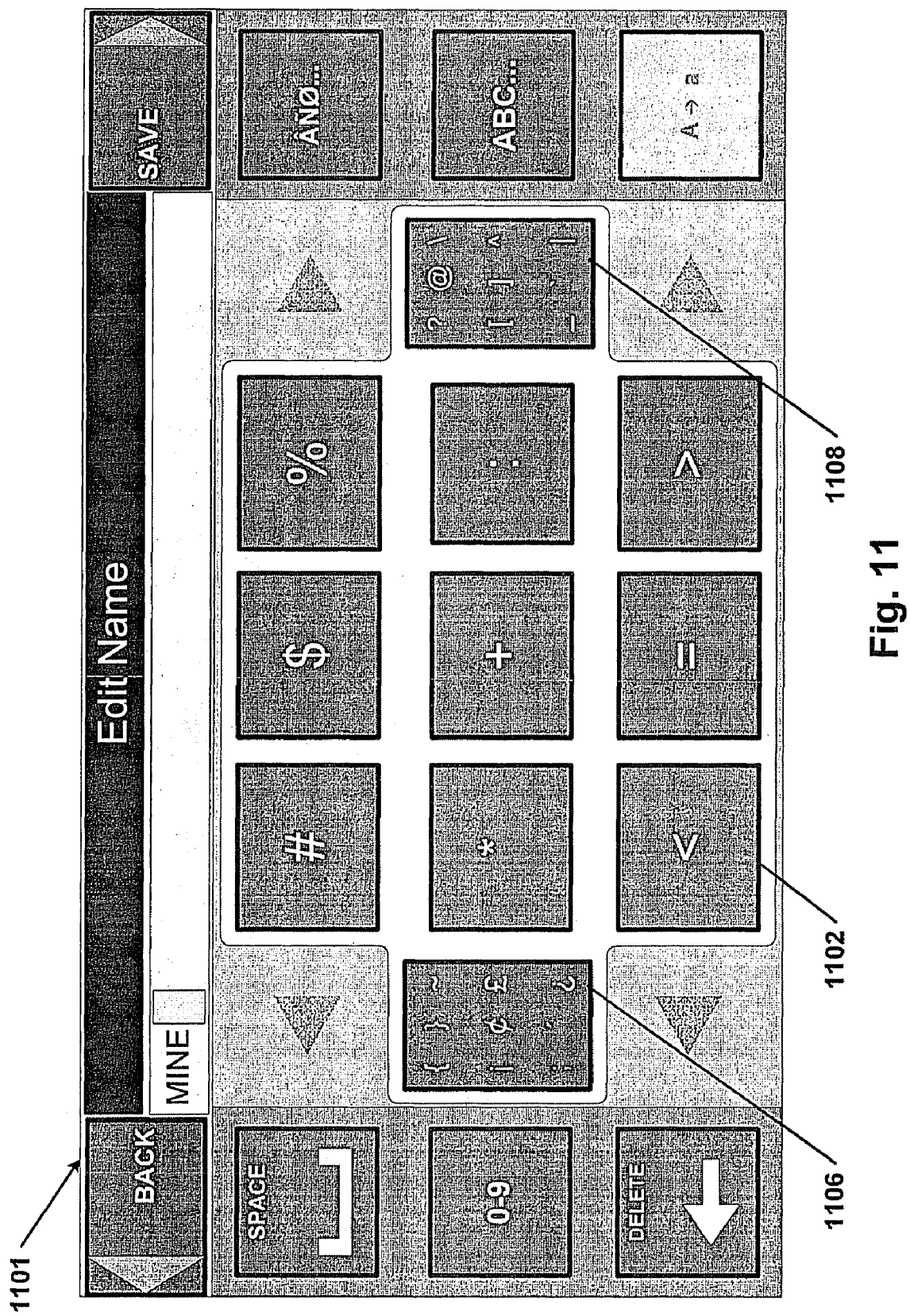
FIG. 11 illustrates an example display screen of an example sixth user interface generated with the text speller module of FIGS. 1-3.

The text speller module 318 may display other user input controls selectable to modify what characters are divided into groups and displayed on corresponding single character user input controls, 502 and 504, and multi-character user input controls, 506 and 528. For example, a user may select a number user input control 536 and the text speller module 318 may modify the characters from letters to numbers as illustrated in FIG. 6. In another example, a user may select a symbol user input control 538 and the text speller module 318 may modify the characters from letters to symbols, such as "$", "@", "!", etc. as illustrated in FIG. 11. In still another example, a user may select an accent user input control 540 and the text speller module 318 may modify the characters from letters to accented characters as illustrated in FIG. 10.

FIG. 6 illustrates an example display screen 601 of an example user interface permitting entry of numbers. In FIG. 6, integers "1" through "9" are displayed on corresponding single character user input controls in a three by three grid, starting at the top-left with "1", counting from left to right, and finishing with "9" at the lower-right. Also in FIG. 6, on display screen 601, integer "0" is displayed on a corresponding single character user input control displayed to the left of the single character user input control that corresponds to the integer "1." In other examples, other arrangements may be used to display numbers, such as in a three by four grid, a five by two grid, and a non-grid arrangement.

Again, the text speller module 318 may display other user input controls that are selectable to modify what characters are divided into groups and displayed on corresponding user input controls. For example, a user may select a letter user input control 636 and the text speller module 318 may modify the characters from numbers back to letters as illustrated in FIG. 5. In other examples, additional or different user inputs controls may be displayed that are selectable to modify what characters are divided into groups and displayed on corresponding user input controls.

Figure 7:
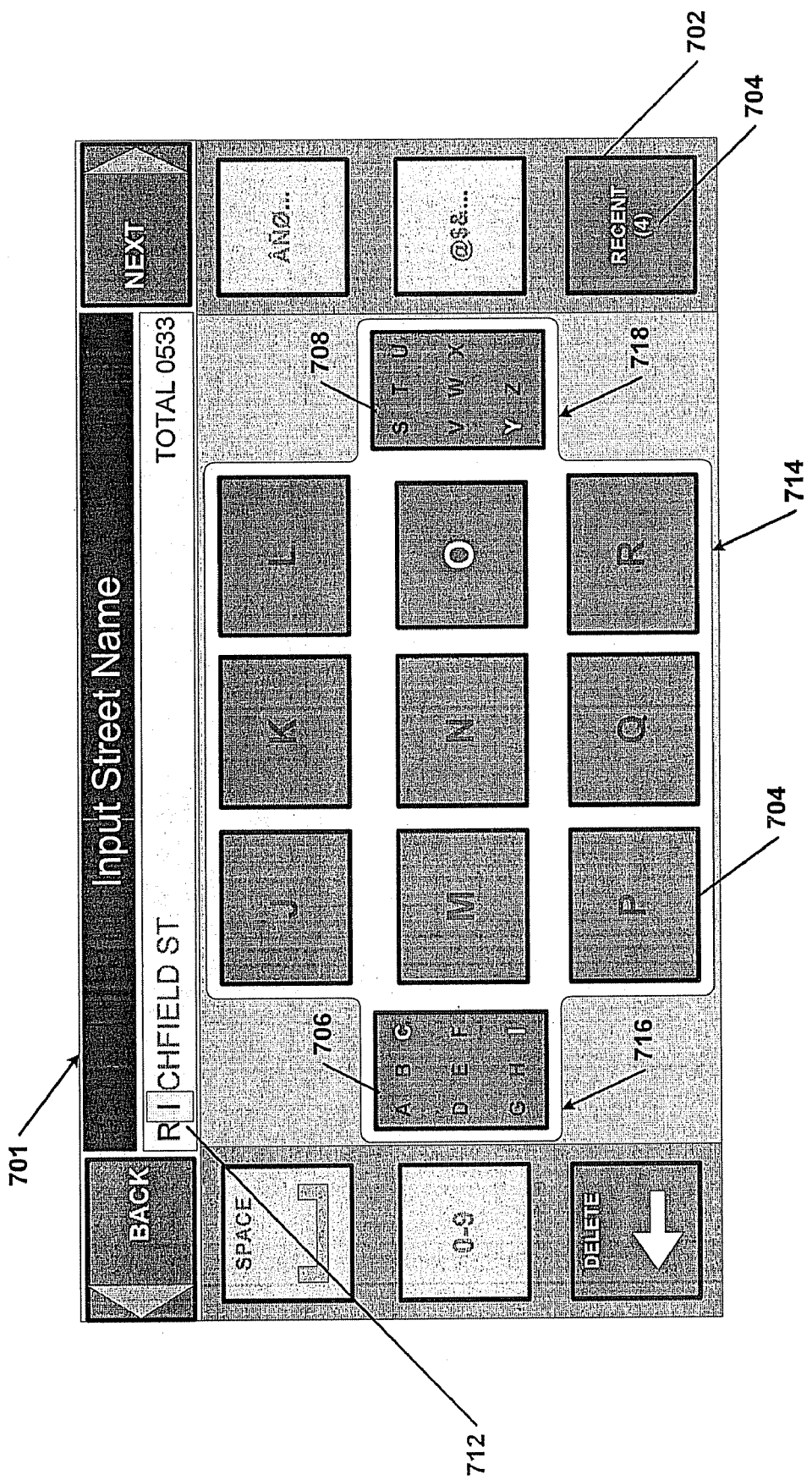
FIG. 7 illustrates an example display screen of an example third user interface generated with the text speller module of FIGS. 1-3.

FIG. 7 illustrates an example display screen 701 of an example third user interface generated with the text speller module of FIGS. 1-3. The text speller module 318 may use a recent user input control 702 to display, and enable selection by a user, of recent entries from the list of recent entries received from the recent entries database 302 (FIG. 3). During operation, if a user selects the recent user input control 702, the text speller module 318 may display a list of recent entries on the example display screen 701 or on a different display screen. The user may then select one of the items in the list of recent entries as his entry, or may return to the example display screen 701 by selecting a cancel user input control. In some examples, the text speller module 318 may display a numerical count 704 of the list of recent entries.

In different examples, the text speller module 318 may display a numerical count 704 of the list of recent entries that match the partial entry 712 made by the user so far. The user may decide not to select recent user input control 702 if the user considers the numerical count 704 to be too large. If no recent entry in the list of recent entries matches the partial entry 712, the text speller module 318 may disable the recent user input control 702.

Display regions, 714, 716, and 718, contain user input controls, 704, 706, and 708. Each display region is sized to include one or more user input controls, 704, 706, and 708, that correspond to selectable characters. Three display regions, 714, 716, and 718 are shown in the example display screen 701. Other examples may have fewer or greater number of display regions. Each of the display regions 716 and 718 may include a multi-character user input control, 706 and 708. The display region 714 may include a group of single character user input controls 704. Characters included in a group that correspond to the display region may remain the same regardless of which of the user input controls included in the display regions is selected. In other examples, the characters included in a group corresponding to one of the regions may change based on a user selection.

Figure 8:
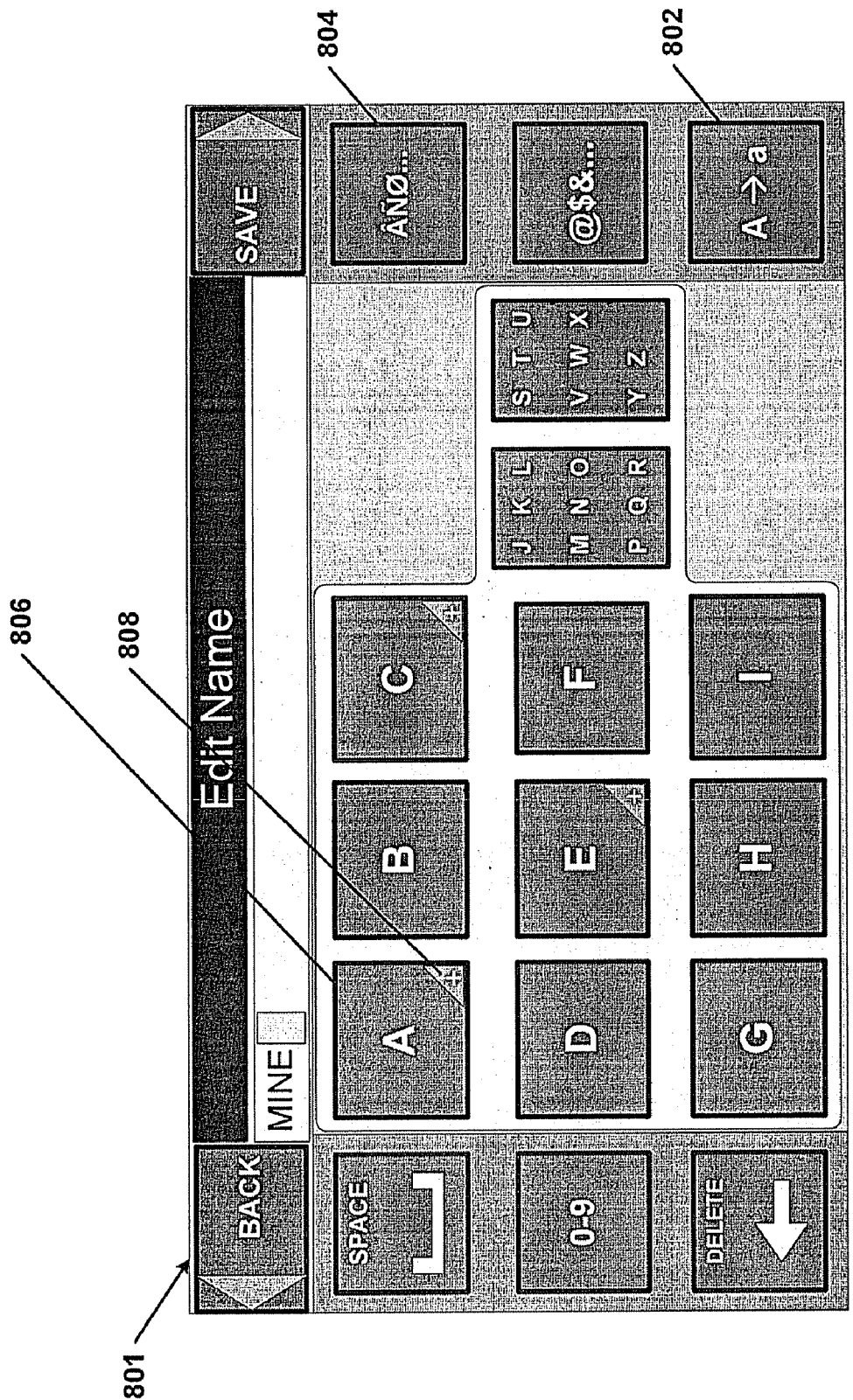
FIG. 8 illustrates an example display screen of an example fourth user interface generated with the text speller module of FIGS. 1-3.

FIG. 8 illustrates an example display screen 801 of an example fourth user interface generated with the text speller modules of FIGS. 1-3. In FIG. 8, the user may select a change case user input control 802. In response to the selection of the change case user input control 802, the text speller module 318 may change the case of the characters displayed on single character user input controls and multi-character user input controls.

Selection of an accent user input control 804 on the example display screen 801 may change the characters displayed to other characters, such as accented characters, as shown in FIG. 10. Accented characters may be considered stylistic variations of common characters. The available set of accented characters may determined from any condition, such as current language and/or territory settings, the character set used, and/or a set of characters specific to the information to be entered.

Figure 9:
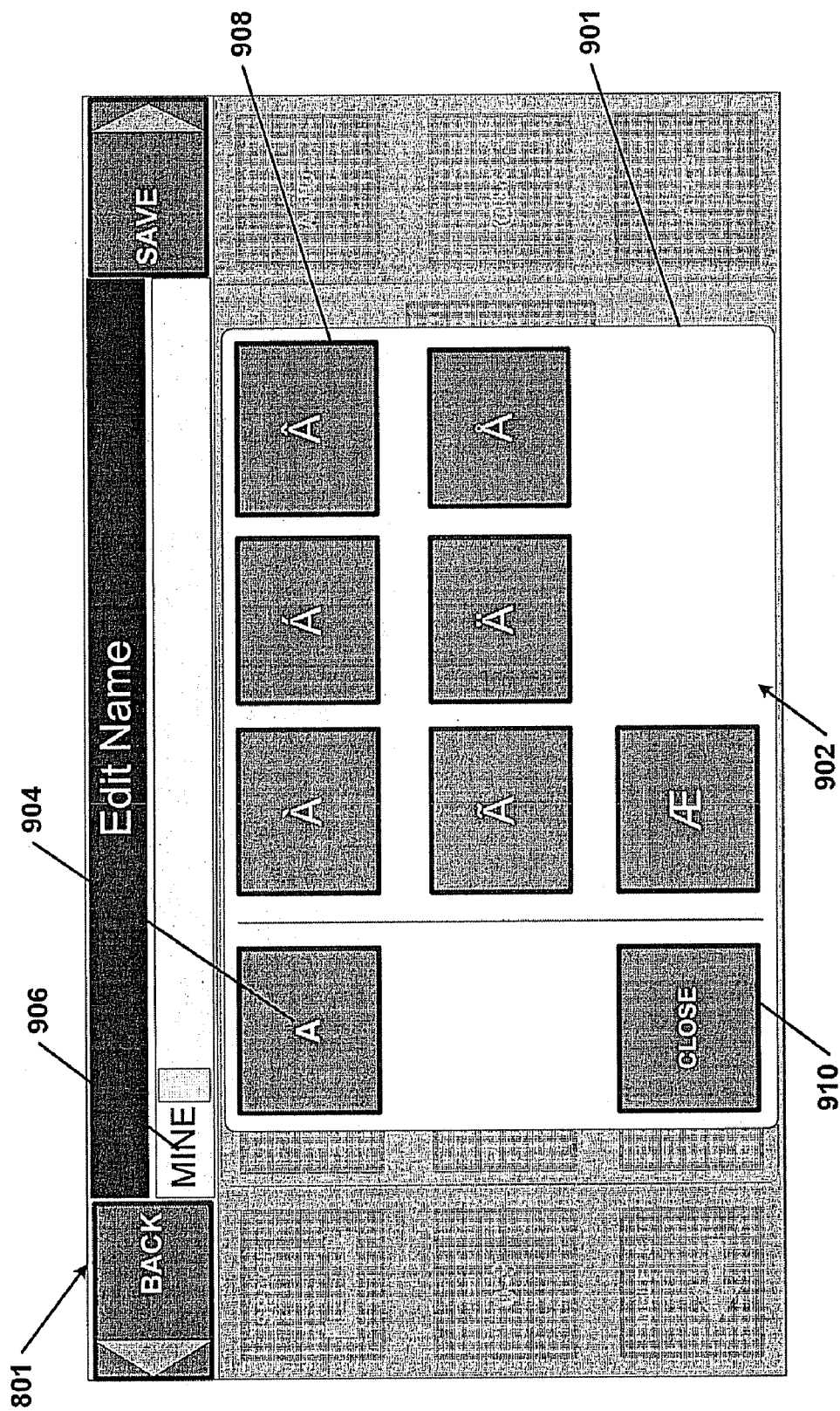
FIG. 9 illustrates an example dialog box superimposed on the example display screen of FIG. 8.

Alternatively or in addition, the accented characters may be accessed using a dialog box 901 as shown in FIG. 9. In FIG. 9, the dialog box 901 is superimposed on the display screen 801 of FIG. 8. In some examples, the dialog box 901 may be a modal dialog box that is displayed over a portion of another display screen 801, where the underlying display screen 801 is disabled. In other examples all or some portion of the underlying display screen 801 may not be disabled. Instead of transitioning to a screen that displays groups of accented characters as illustrated in FIG. 10, a subset of the accented characters may be displayed in the dialog box 901. The subset of the accented characters may be a family of accented characters 902. For example, the family of accented characters 902 may include accented characters that share a common root character 904, where the root character 904 has no accent mark. For example, a family of characters including "À", "Á", "Â", "Ã", "Ä", "Å", and ""Æ",", may be said to have a root character 904 of "A". The root character 904 may be displayed in the dialog box 901 along with the other members of the family of characters 902. In other examples, any other groupings or subsets of characters may be provided in one or more dialog boxes 901. For example, the dialog box 901 may display a subset of the alphabet, a subset that includes a mixture of commonly used characters, such as numbers and letters, or any other subset of characters.

Referring to FIGS. 8 and 9, a user may initiate generation of the dialog box 901 by requesting the dialog box 901 during operation. In one example, the user may request the dialog box 901 using a single character user input control 806 on a display screen, such as display screen 801. The single character user input control 806 may correspond to the root character of the subset of characters included in the dialog box 901. For example, as illustrated in display screen 801 and dialog box 901, a root character 904 "A" may be selected to display a family of characters 902 related to the root character "A." A user may request the dialog box 901 using a secondary selection mechanism of the single character user input control 806, such as pressing and holding the single character user input control 806 for a predetermined period of time, moving a cursor over the single character user input control 806 and clicking on a certain mouse button, selecting another button while also selecting the single character user input control 806, double-clicking the single character user input control 806, or any other selection mechanism that is different than simply selecting the single character user input control 806 with a primary selection mechanism.

The existence of a subset of characters, such as the accented characters, related to a root character 904, such as the letter "A," may be indicated with a visual indication 808 displayed on or proximate to the single character user input control 806, such as a plus sign as depicted in display screen 801. Any visual indication 808 may be used, such as displaying a single character user input control 806 with a unique color, using italics to display the root character 904 on the single character user input control 806, and outlining the single character user input control 806. In other examples, the text speller module 318 may not display any visual indication 808.

Within the dialog box 901, single character user input controls 908 that each correspond to a respective member of the family of characters 902 may be selected by a user. Upon selection of one of the single character user input controls 908, the text speller module 318 may add the character corresponding to the selected single character user input control 908 to a partial entry 906. In some examples, in response to selection of one of the single character user input controls 908, the text speller module 318 may also dismiss the dialog box 901, and transition to the underlying display screen, such as display screen 801. Alternatively, or in addition, the text speller module 318 may dismiss the dialog box 901 in response to selection of a close user input control 910 by the user. In one example, the text speller module 318 may dismiss the dialog box 901 without modifying the partial entry 906 when the close user input control 910 is selected. In another example, any character corresponding to a single character user input control 908 selected in the dialog box 901 may be first added to the partial entry 906 by the text speller module 318 in response to selection of the close user input control 910.

In yet another example, the dialog box 901 may be displayed automatically if multiple accented or alternate characters are available for a root character 904 and the user selects the single character user input control 806 in the display screen 801 corresponding to the root character 904. Alternatively or in addition, if the root character 904 is not available due to a list of possible entries restriction and only one alternate character is available, the text speller module 318 may display the alternate character instead of the root letter on the single character user input control 806 in the display screen 801.

FIG. 10 illustrates an example display screen 1001 of an example fifth user interface generated with the text speller modules of FIGS. 1-3. In one example, the characters displayed in the display screen 1001 are accented characters. The accented characters may be displayed on single character user input controls 1002 and on multi-character user input controls, 1006 and 1008.

FIG. 11 illustrates an example display screen 1101 of an example sixth user interface generated with the text speller module of FIGS. 1-3. In one example, the characters displayed in the display screen 1101 are symbols, such as #, $, %, *, etc. The symbols may be displayed on single character user input controls 1102 and on multi-character user input controls, 1106 and 1108.

Figure 12:
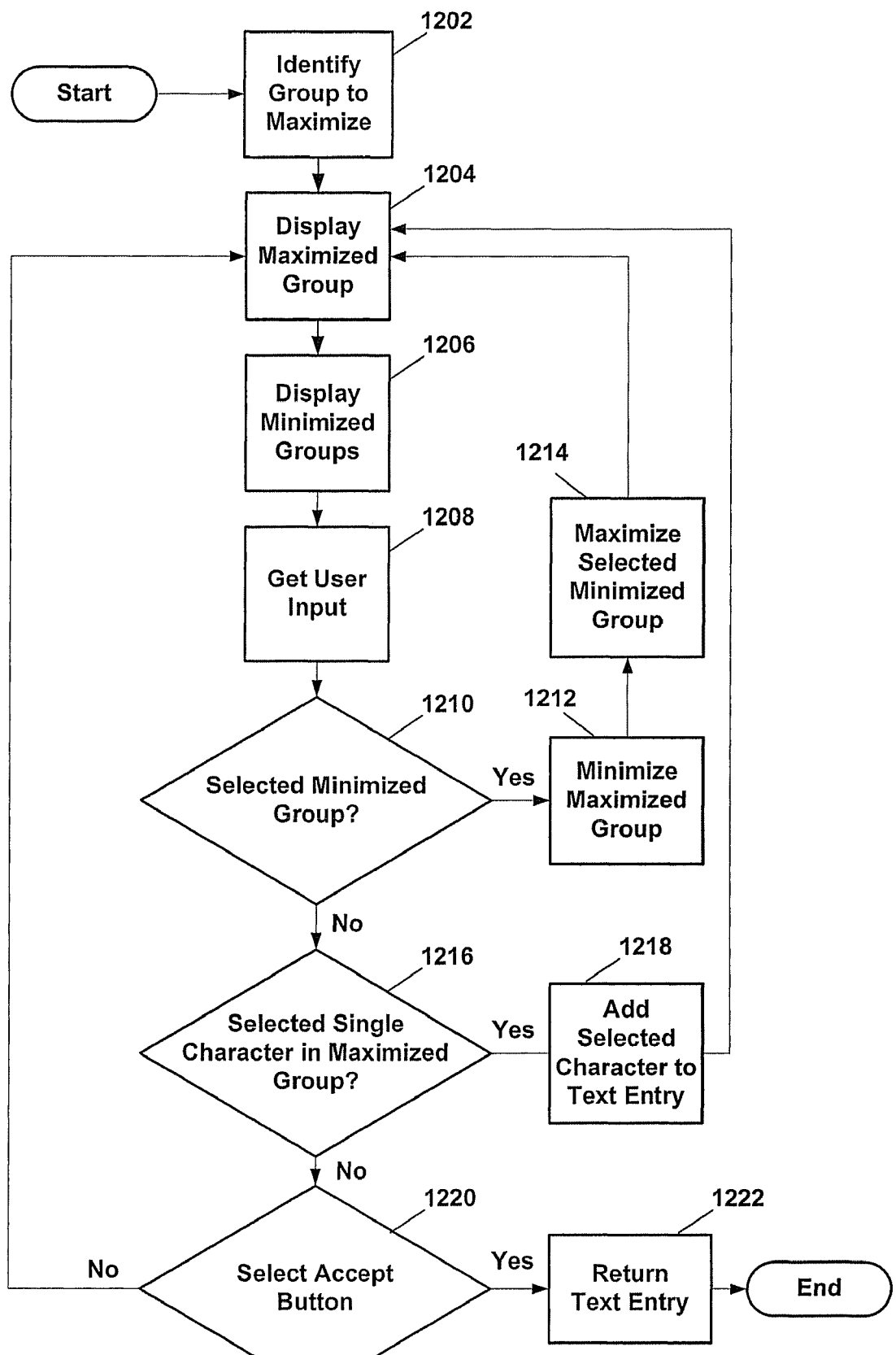
FIG. 12 illustrates a flow diagram illustrating a first example operation of the text speller module of FIGS. 1-3 to obtain a text entry using user input controls displayed on a display.

FIG. 12 is a flow diagram illustrating a first example operation of the text speller module of FIGS. 1-3 to obtain a text entry using user input controls displayed on a display. More specifically, FIG. 12 depicts operations related to selection of a minimized group, selection of a character in a maximized group, and selection of acceptance of a text entry. However, there are other operations associated with obtaining a text entry using user input controls drawn on a display not depicted or discussed. The user input controls represent characters, where the characters are divided into groups, as previously discussed. The characters may be divided into any number of groups and the groups may be of any size. Each of the groups may be substantially the same size as the other groups. Alternatively, the groups may be different sizes. The groups may be ordered in any manner such as by an associated character set sequence, alphabetically, by frequency of use, or by any combination thereof. In one example, where the characters are the letters of the English alphabet, the letters may be divided into three groups: a first group of characters "A"-"I," a second group of characters "J"-"R," and a third group of characters "S"-"Z."

In FIG. 12, at block 1202, the operation begins by internally identifying one of the groups of characters as a maximized group. Identification of the maximized group may include starting with a first group as ordered alphabetically, with a first group as ordered by a character set sequence, with a first group as ordered by most frequently used, with a first group that is the group that was last maximized, or with a randomly selected group.

The operation may include internally identifying all other groups as minimized groups. Alternatively, no group may be maximized at the beginning. In another example, one group may be initially maximized, but if, after no user input control is selected for a predetermined period of time, the maximized group is minimized.

Displaying the maximized group occurs at block 1204. Display of the maximized group may include displaying a single character user input control corresponding to each character in the maximized group. Display of the maximized group may also include displaying the single character user input controls in a determined pattern, such as a three-by-three matrix. If the number of characters in the group is less than the number of characters in the determined pattern, the determined pattern may be automatically modified by the text speller module to adjust the display of the maximized group. For example, if the predetermined pattern is a three-by-three matrix, and there are less than nine characters in the group to be maximized, then displaying the single character user input controls in a three-by-three matrix may include leaving blank spaces in a predetermined location, such as in the bottom-right portion of the matrix.

Minimized groups may be displayed at block 1206. Display of the minimized groups may include displaying a multi-character user input control corresponding to each of the minimized groups. The multi-character user input control may be graphically represented as a tab user interface element. In another example, the multi-character user input controls may be graphically represented as an overlapping set of cards.

Displaying a multi-character user input control may include displaying a visual indication of each of the minimized groups on corresponding multi-character user input controls, where the visual indication indicates the characters that belong to each of the minimized groups. For example, the visual indication may include displaying all of the characters in the group on the user input control, displaying the combination of the first character in the group, a "-", and the last character in the group to indicate the range of characters in the group, or any other form of visual indication that provides the user with an indication of what characters are included in the minimized group.

Displaying a multi-character user input control may include positioning the multi-character user input control along a single axis of the display. A matrix of single character user input controls and one or more other multi-character user input controls may also be positioned along the single axis. The single axis may be at any angle, such as horizontal, vertical, or 45 degrees from the horizontal. The multi-character user input control, the matrix of single character user input controls, and other multi-character user input controls may be ordered along the single axis in a predetermined order. For example, each of the characters included in all of the groups may be ordered in a predefined sequence, such as an alphabetic sequence or in a sequence defined by a numerical representation of each of the characters in a character set. The predefined order may then be the order of each of the groups based on a relative position, in the predefined sequence, of a beginning character of each of the groups. In other examples, some of user input controls may be displayed along two different axes.

As discussed, minimized groups may be displayed at block 1206. Displaying the minimized groups may include positioning the multi-character user input controls and the single character user input controls in a window that does not entirely fit within the display. In addition, displaying the minimized groups may further include permitting the user to alter the displayed portion of the window by receipt of one or more user inputs. The user inputs could be any method or mechanism that enables movement of the display to depict the non-displayed portion of the window, such as scrolling by selecting a blank portion of a scroll bar, clicking on and dragging a scroll bar button, spinning a wheel button, or any other user input that initiates adjustment of the position of the window in the display.

Displaying the maximized group and displaying the minimized group(s) may also include shifting non-critical items off screen to provide more area for the expanded group. For example, this may include shifting graphical elements, such as title area text like "Input Street Name", off of the display screen while the group is maximized. In addition to shifting graphical elements off of the display screen, displaying the maximized group may also include shifting up other graphical elements, such as an entry field, to take the location of the shifted graphical elements. After a character is selected, the operation may include minimizing the group and shifting the shifted graphical elements back onto the display screen and/or any other items that moved.

If a character group changes status from minimized to maximized or from maximized to minimized, animation transitions may be used to graphically emphasize the transition. The type of animation used may be configurable by the user.

At block 1208, a signal indicating a user input is received by the text speller module. The user input may be received via the user interface module from any form of one or more user input devices such as contact with a touch screen of the display, a key press, a mouse move, a button click, a voice command, or any other user input capable of providing an electric signal to the text speller module.

At block 1210, the text speller module determines whether the user input signal indicates user selection of a minimized group. The determination may include any manner of checking whether the user input signal is a multi-character signal. For example, the determination may include checking for a contact on the display screen above a corresponding multi-character user input control, a hardware key press on the device, a mouse move over the multi-character user input control, or any other mechanism for selecting a currently minimized group to be maximized.

If a multi-character signal is received from the user input device, then the group of characters corresponding to the multi-character user input control is a selected group of characters. In response to receipt of the multi-character signal, the currently maximized group (if available) is identified as one of the minimized groups at block 1212. At block 1214, the operation continues by internally identifying the selected group of characters as the maximized group. The operation returns to block 1204 to display the maximized group.

Alternatively, at block 1210, if the input signal received from the user input device is not a multi-character signal, the operation continues at block 1216 by checking whether whether a single character signal was received from the user input device. Receipt of the single character signal may be indicative of the user input device selecting one of the single character user input controls. The receipt of the single character signal may indicate the user's desire to select a character in the currently maximized group of characters. Such a selection may occur by user contact with a touch screen on an associated single character user input control, a key press, a mouse move over the associated single character user input control in combination with a mouse button click, a voice command, or any other mechanism for selecting a single character user input control.

If, at block 1216, the single character signal was received, the operation continues at block 1218 by adding the selected character to a text entry. Adding the selected character to a text entry may include simply adding the character to a text entry or setting the text entry to the selected character if the text entry is not yet set to any value. The operation then returns to block 1204 to display the maximized group.

If, at block 1216, the single character signal was not received, the operation continues at block 1220 where it is determined if the user input indicates the user's desire to accept the text entry. Such a user input may be initiated by a touch screen contact with an accept user input control, a key press on the device, a voice command, or any other any other mechanism for selection of acceptance of a current text entry. If the user input is not determined to be acceptance of a current text entry, the operation determines the user command embodied in the signal and returns to block 1204 to display a maximized group. If the user input is determined to be acceptance of a current text entry, at block 1222, the text speller module returns the text entry to the application in which the text speller module is operating and the operation ends.

Figure 13:
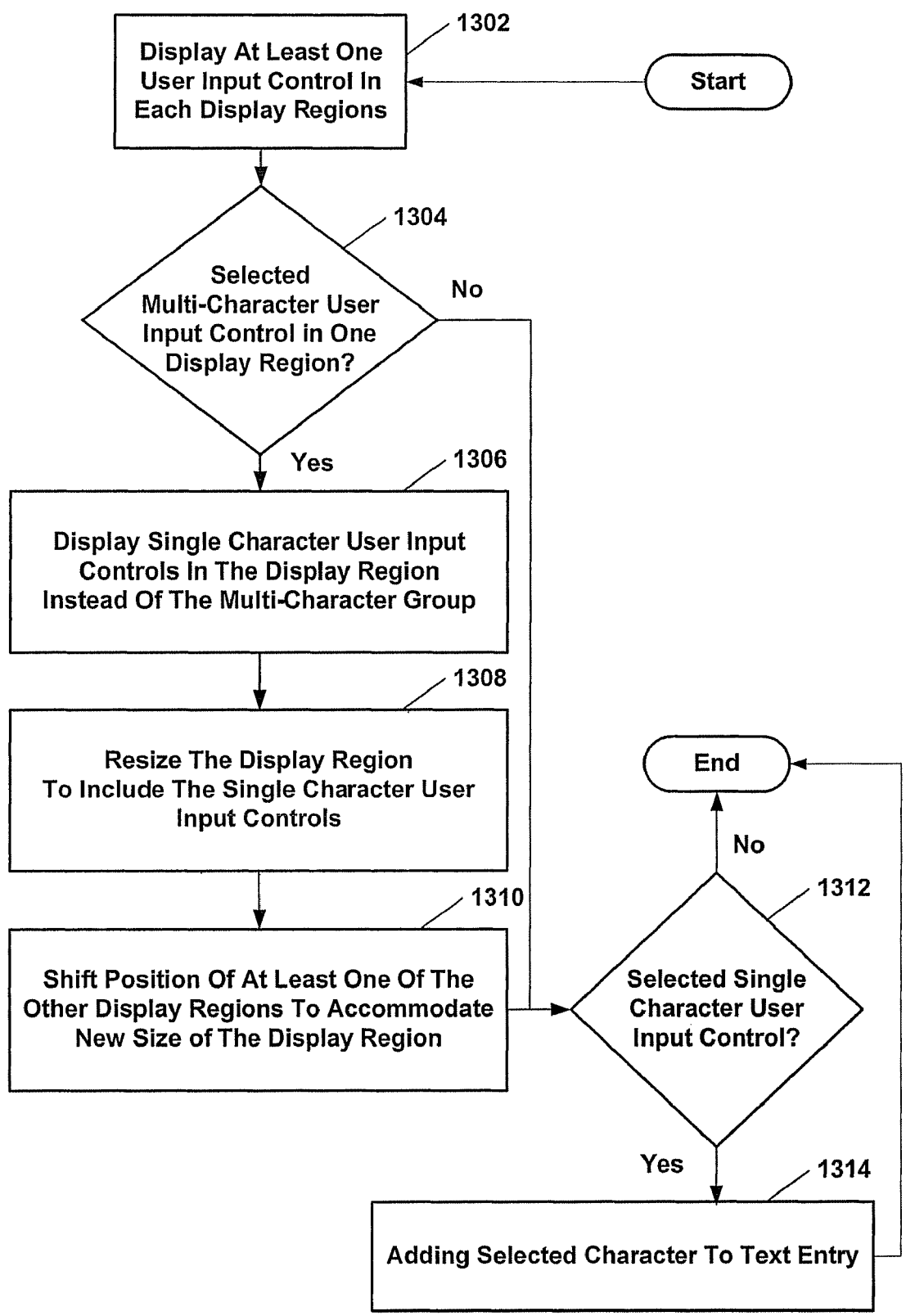
FIG. 13 illustrates a flow diagram illustrating a second example operation of the text speller module of FIGS. 1-3 to obtain a text entry using user input controls displayed on a display.

FIG. 13 is a flow diagram illustrating a second example operation of the text speller module of FIGS. 1-3 to obtain a text entry using user input controls displayed on a display. The operation may begin at block 1302, by displaying at least one user input control in different display regions of the display. Each of the display regions may be positioned and sized to include the at least one of the user input controls. Each of the display regions may correspond to a group of characters formed from selectable characters. The user input controls may include a multi-character user input control, which is displayed in one of the display regions that corresponds to one of the groups.

At block 1304, the operation may continue by checking for receipt of a multi-character signal from a user input device, where the multi-character signal is indicative of the user input device selecting the multi-character user input control. If the multi-character user input control was not selected at block 1304, the operation may continue, at block 1312, to check for selection of a single character user input control. Alternatively, if the multi-character user input control was selected at block 1304, the operation may continue at block 1306 by displaying single character user input controls in the display region instead of the multi-character user input control. The single character user input controls correspond to the characters included in the group corresponding to the multi-character user input control.

The operation may proceed at block 1308 by resizing the display region to a new size, where the display region is sized to include the single character user input controls. Furthermore, the operation may proceed at block 1310 by shifting the position of at least one of the display regions other than the display region in order to accommodate the new size of the display region.

At block 1312, the operation continues by checking for selection of a single character user input control. The single character user input control corresponds to a selected character.

If, at block 1312, the single character user input control was selected, the operation may continue at block 1314 by adding the selected character to the text entry. The second example operation then completes. Alternatively, if the single character user input control was not selected, then the second example operation completes without adding the selected character to the text entry.

Using relatively large buttons may make a text speller easier to use. Users with large fingers tend to favor larger buttons. Large letters may be displayed on large buttons. Users with poor eyesight may find reading large letters easier than small letters.

Using relatively large buttons may impose on a user the burden of making many selections in order to select a desired character. The various embodiments of the invention described enable the use of relatively large buttons without imposing a burden of making many selections in order to make an text entry.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. An apparatus comprising:
   a display;
   a user input device;
   a memory; and
   a processor in communication with the memory, the display, and the user input device, where the processor is operable to:
      direct display of a plurality of first single character user input controls in a first multi-control display region on the display;
      direct display of a first multi-character user input control in a first single control display region on the display, where the first multi-control display region that comprises the plurality of the first single character user input controls is larger than the first single control display region that comprises the first multi-character user input control;
      replace the first multi-character user input control with a plurality of second single character user input controls in response to receipt of a selection signal from the user input device indicative of a user selection of the first multi-character user input control, where the second single character user input controls are displayed in an expanded display region that includes the first single control display region, the expanded display region being a second multi-control display region that is larger than the first single control display region; and
      replace the first single character user input controls with a second multi-character user input control in response to the receipt of the selection signal indicative of the user selection of the first multi-character user input control, where the second multi-character user input control is displayed in a second single control region that is smaller than the first multi-control display region.

2. The apparatus of claim 1, where the selection signal is a first selection signal, the user selection is a first user selection, and the processor is further operable to:
   generate a text entry in response to receipt of a second selection signal from the user input device indicative of a second user selection of one of the first single character user input controls, where the one of the first single character user input controls corresponds to a maximized character and the text entry includes the maximized character.

3. The apparatus of claim 2, further comprising an entries database stored in the memory, and where the processor is further operable to:
   retrieve entries from the entries database, where each of the entries comprises a first character followed by a next character, the first character of each of the entries matched with the maximized character.

4. The apparatus of claim 3, where the processor is further operable to:
   direct display on the display of a plurality of minimized characters of a minimized group on the first multi-character user input control, where any of the minimized characters that is matched to any next character of each of the entries is displayed differently than any non-matched character.

5. The apparatus of claim 3, where the processor is further operable to:
   direct display on the display of a third multi-character user input control as disabled, where the third multi-character user input control corresponds to a group of characters, and the group of characters includes only characters not matched with any next character of each of the entries.

6. The apparatus of claim 3, where the processor is further operable to:
   generate the text entry to also include a selected character in response to receipt of a third selection signal from the user input device indicative of a third user selection of a third multi-character user input control, where the third multi-character user input control corresponds to a group of characters, and no character other than the selected character included in the group of characters is matched with any next character of each of the entries.

7. The apparatus of claim 3, where the entries are recent entries, the recent entries include a plurality of text entries generated previously, and the entries database is a recent entries database.

8. The apparatus of claim 1, where the processor is further operable to:
   position the first multi-character user input control and a collection of the first single character user input controls along a single axis in the display, where each of the first multi-character user input control and the collection of the first single character user input controls is positioned on the display based on an order of each of a plurality of character groups, and each of the first multi-character user input control and the collection of single character user input controls correspond to a respective one of the character groups.

9. The apparatus of claim 1, where the processor is further operable to:
   direct display on the display of a plurality of minimized characters of a a minimized group on the first multi-character user input control.

10. The apparatus of claim 9, where the processor is further operable to:
    direct display on the display of the minimized characters of the minimized group in a first font size and to direct display on the display of a plurality of maximized characters corresponding to the first single character user input controls in a second font size, where the first font size is smaller than the second font size.

11. A method of displaying a plurality of user input controls, the method comprising:
    displaying at least one of the user input controls in each respective one of a plurality of display regions, where each of the display regions corresponds to a respective one of a plurality of character groups formed from a plurality of selectable characters and the user input controls include a first multi-character user input control displayed in a first one of the display regions and a plurality of first single character user input controls in a second one of the display regions;

replacing the first multi-character user input control with a plurality of second single character user input controls in the first one of the display regions in response to selection of the first multi-character user input control with a user input device; and replacing the first single character user input controls with a second multi-character user input control in the second one of the display regions in response to the selection of the first multi-character user input control, where the first one of the display regions increases in size to include the second single character user input controls in response to the selection of the first multi-character user input control, and where the second one of the display regions decreases in size to include the second multi-character user input control in response to the selection of the first multi-character user input control.

12. The method of claim 11, where replacing the first multi-character user input control comprises:

resizing the first one of the display regions to a determined size; and shifting a position of the second one of the display regions to accommodate the determined size of the first one of the display regions.

13. The method of claim 11, further comprising:

adding a selected character to a text entry in response to selection of one of the first single character user input controls with the user input device, where the one of the first single character user input controls corresponds to the selected character.

14. The method of claim 11, further comprising:

displaying a visual indication on the first multi-character user input control, where the first multi-character user input control corresponds to a plurality of minimized characters, and the visual indication includes display of the minimized characters.

15. The method of claim 11, further comprising:

receiving a selection signal from the user input device, the selection signal indicative of a secondary selection mechanism of one of the first single character user input controls; and displaying a family of characters based on a root character in response to receipt of the selection signal, where the one of the first single character user input controls corresponds to the root character.

16. The method of claim 15, further comprising:

displaying a visual indication on the one of the first single character user input controls, where the visual indication indicates the one of the first single character user input controls is selectable with the secondary selection mechanism.

17. The method of claim 11, where the first single character user input controls are displayed in a three by three grid formed in the first one of the display regions.

18. A system comprising:

a display;

a user input device;

a memory; and a processor in communication with the memory, the display and the user input device, where the memory includes computer code, and the computer code comprises:

code executable with the processor to direct display of a plurality of first single character user input controls in a first display region on the display;

code executable with the processor to direct display of a first multi-character user input control and a second multi-character user input control on the display, where the first display region that comprises the first single character user input controls is larger than a second display region that comprises the first multi-character user input control, and where the first display region that comprises the first single user input controls is larger than a third display region that comprises the second multi-character user input control;

code executable with the processor to replace the first multi-character user input control with a plurality of second single character user input controls in response to receipt of a selection signal from the user input device indicative of a user selection of the first multi-character user input control, where the second single character user input controls are displayed in an expanded display region and the expanded display region is larger than the second display region; and code executable to replace the first single character user input controls with a third multi-character user input control in response to the receipt of the selection signal indicative of the user selection of the first multi-character user input control, where the third multi-character user input control is displayed in a reduced display region that is smaller than the first display region, where the first single character user input controls and the first and second multi-character user input controls are displayed together on the display prior to the receipt of the selection signal, and where the second and third multi-character user input controls and the second single character user input controls are displayed together on the display after the receipt of the selection signal.

* * * * *